(12) United States Patent
Asif Bashir et al.

(10) Patent No.: US 10,943,616 B2
(45) Date of Patent: *Mar. 9, 2021

(54) CURRENT-ASSISTED MAGNETIC RECORDING WRITE HEAD WITH WIDE CONDUCTIVE ELEMENT IN THE WRITE GAP

(71) Applicant: Western Digital Technologies, Inc., San Jose, CA (US)

(72) Inventors: Muhammad Asif Bashir, San Jose, CA (US); Venkatesh Chembrolu, Fremont, CA (US); Alexander Goncharov, Morgan Hill, CA (US); Petrus Antonius Van Der Heijden, Cupertino, CA (US); Yingjian Chen, Fremont, CA (US)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/010,698

(22) Filed: Sep. 2, 2020

(65) Prior Publication Data

US 2020/0402532 A1    Dec. 24, 2020

Related U.S. Application Data

(63) Continuation of application No. 16/366,829, filed on Mar. 27, 2019, now Pat. No. 10,839,844.

(Continued)

(51) Int. Cl.
*G11B 5/60*    (2006.01)
*G11B 5/39*    (2006.01)

(52) U.S. Cl.
CPC .......... *G11B 5/6082* (2013.01); *G11B 5/3912* (2013.01)

(58) Field of Classification Search
None
See application file for complete search history.

(56) References Cited

U.S. PATENT DOCUMENTS

| 4,822,159 A | 4/1989 | Gaiser |
| 4,881,143 A | 11/1989 | Bhattacharyya et al. |

(Continued)

FOREIGN PATENT DOCUMENTS

| CN | 104835510 B | 11/2017 |
| JP | 2013251042 A | 12/2013 |
| WO | 2015126326 A1 | 8/2015 |

OTHER PUBLICATIONS

Mallary, Mike et al; "Head and Media Challenges for 3 Tb/in2 Microwave-Assisted Magnetic Recording"; IEEE Transactions on Magnetics, vol. 50, No. 7, Jul. 2014 (8 pages).

(Continued)

*Primary Examiner* — Brian E Miller
(74) *Attorney, Agent, or Firm* — Patterson & Sheridan, LLP; Steven H. Versteeg

(57) ABSTRACT

A current-assisted magnetic recording write head has an electrically conductive layer in the write gap between the write pole and the trailing shield. Electrical circuitry directs current between the write pole and the trailing shield, through the conductive layer in the write gap. The current through the conductive layer generates an Ampere field substantially orthogonal to the magnetization in the write pole to assist magnetization switching of the write pole. The conductive layer is wider in the cross-track direction than the trailing edge of the write pole and may extend beyond the write pole side gaps so as to be in contact with both the side shields and the trailing shield. The conductive layer (Continued)

may have substantially the same along-the-track thickness across its width or it may have a thicker central region at the write pole trailing edge and thinner side regions.

20 Claims, 9 Drawing Sheets

Related U.S. Application Data

(60) Provisional application No. 62/686,208, filed on Jun. 18, 2018.

(56) References Cited

U.S. PATENT DOCUMENTS

| | | | |
|---|---|---|---|
| 5,784,224 A | 7/1998 | Rottmayer et al. | |
| 6,493,183 B1 | 12/2002 | Kasiraj et al. | |
| 6,636,393 B1 | 10/2003 | Araki et al. | |
| 6,661,623 B1 | 12/2003 | Tsuchiya et al. | |
| 6,820,022 B2 | 11/2004 | Popp et al. | |
| 7,072,142 B2 | 7/2006 | Lam | |
| 7,397,633 B2 | 7/2008 | Xue et al. | |
| 7,983,002 B2 | 7/2011 | Pust et al. | |
| 8,107,352 B1 | 1/2012 | Yamanaka et al. | |
| 8,116,031 B2 | 2/2012 | Alex et al. | |
| 8,159,781 B2 | 4/2012 | Taguchi et al. | |
| 8,189,292 B2 | 5/2012 | Pentek et al. | |
| 8,194,361 B2 | 6/2012 | Kudo et al. | |
| 8,230,571 B2 | 7/2012 | Kovac | |
| 8,238,059 B1 | 8/2012 | Tang et al. | |
| 8,339,736 B2 | 12/2012 | Gao et al. | |
| 8,355,222 B2 | 1/2013 | Mino et al. | |
| 8,390,955 B1 | 3/2013 | Sasaki et al. | |
| 8,404,128 B1 | 3/2013 | Zhang et al. | |
| 8,405,930 B1 | 3/2013 | Li et al. | |
| 8,422,159 B2 | 4/2013 | Gao et al. | |
| 8,456,967 B1 | 6/2013 | Mallary | |
| 8,472,135 B1 | 6/2013 | Kusukawa et al. | |
| 8,508,984 B2 | 8/2013 | Ranjan et al. | |
| 8,547,661 B2 | 10/2013 | Bai | |
| 8,553,362 B2 | 10/2013 | Tanabe et al. | |
| 8,582,240 B1 | 11/2013 | Chen et al. | |
| 8,634,163 B2 | 1/2014 | Tanabe et al. | |
| 8,767,346 B2 | 7/2014 | Yamada et al. | |
| 8,786,984 B2 | 7/2014 | Das et al. | |
| 8,810,961 B2 | 8/2014 | Taguchi et al. | |
| 8,837,088 B1 | 9/2014 | Kimura et al. | |
| 8,908,330 B1 | 12/2014 | Mallary | |
| 8,929,030 B2 | 1/2015 | Hou et al. | |
| 8,930,955 B2 | 1/2015 | Baset et al. | |
| 8,988,826 B2 | 3/2015 | Sugiyama et al. | |
| 8,995,088 B1 | 3/2015 | Boone et al. | |
| 9,047,887 B2 | 6/2015 | Funayama | |
| 9,099,102 B2 | 8/2015 | Katada et al. | |
| 9,129,621 B1 | 9/2015 | Kimura et al. | |
| 9,142,227 B1 | 9/2015 | Etoh et al. | |
| 9,230,568 B1 | 1/2016 | Ikegawa et al. | |
| 9,230,571 B1 | 1/2016 | Chen et al. | |
| 9,230,573 B1 | 1/2016 | Etoh et al. | |
| 9,275,672 B2 | 3/2016 | Shiroishi et al. | |
| 9,286,916 B1 | 3/2016 | Rivkin et al. | |
| 9,311,934 B1 | 4/2016 | Shiimoto et al. | |
| 9,368,135 B2 | 6/2016 | Gao | |
| 9,390,733 B2 | 7/2016 | Etoh et al. | |
| 9,406,316 B2 | 8/2016 | Urakami et al. | |
| 9,449,621 B1 | 9/2016 | Mauri et al. | |
| 9,551,637 B2 | 1/2017 | Fox et al. | |
| 9,589,581 B2 | 3/2017 | Takagishi et al. | |
| 9,640,203 B1 | 5/2017 | Buch et al. | |
| 9,640,206 B1 | 5/2017 | Saito et al. | |
| 9,691,415 B2 | 6/2017 | Koui | |
| 9,747,932 B1 | 8/2017 | Taguchi et al. | |
| 9,870,786 B2 | 1/2018 | Funayama et al. | |
| 9,881,637 B1 | 1/2018 | Wilson et al. | |
| 10,014,012 B1 | 7/2018 | Song et al. | |
| 10,121,497 B1 | 11/2018 | Takahashi et al. | |
| 10,186,284 B2 | 1/2019 | Narita et al. | |
| 10,210,888 B1 | 2/2019 | Li et al. | |
| 10,236,021 B2 | 3/2019 | Narita et al. | |
| 10,276,193 B2 | 4/2019 | Narita et al. | |
| 10,325,618 B1 | 6/2019 | Wu et al. | |
| 10,366,714 B1 | 7/2019 | Olson et al. | |
| 10,839,844 B1 * | 11/2020 | Asif Bashir | G11B 5/3912 |
| 2001/0020884 A1 | 9/2001 | Araki et al. | |
| 2003/0112555 A1 | 6/2003 | Sato et al. | |
| 2005/0058855 A1 | 3/2005 | Girt | |
| 2005/0128637 A1 | 6/2005 | Johnston et al. | |
| 2005/0219748 A1 | 10/2005 | Guthrie et al. | |
| 2005/0219758 A1 | 10/2005 | Roth | |
| 2006/0067016 A1 | 3/2006 | Childress et al. | |
| 2006/0215315 A1 | 9/2006 | Miyake et al. | |
| 2007/0121249 A1 | 5/2007 | Parker | |
| 2007/0297081 A1 | 12/2007 | Nazarov et al. | |
| 2008/0112087 A1 | 5/2008 | Clinton et al. | |
| 2008/0268291 A1 | 10/2008 | Akiyama et al. | |
| 2008/0304176 A1 | 12/2008 | Takagishi et al. | |
| 2009/0009907 A1 | 1/2009 | Zhang et al. | |
| 2009/0016266 A1 | 1/2009 | Kim et al. | |
| 2009/0059423 A1 | 3/2009 | Yamada et al. | |
| 2009/0080120 A1 | 3/2009 | Funayama et al. | |
| 2009/0168266 A1 | 7/2009 | Sato et al. | |
| 2009/0262636 A1 | 10/2009 | Xue et al. | |
| 2009/0310244 A1 | 12/2009 | Shimazawa et al. | |
| 2010/0290156 A1 | 11/2010 | Anderson | |
| 2010/0315747 A1 | 12/2010 | Matsumoto et al. | |
| 2011/0090584 A1 | 4/2011 | Franca-Neto et al. | |
| 2011/0216432 A1 | 9/2011 | Yanagisawa | |
| 2011/0216435 A1 | 9/2011 | Shiimoto et al. | |
| 2011/0293967 A1 | 12/2011 | Zhang et al. | |
| 2012/0044598 A1 | 2/2012 | Bai et al. | |
| 2012/0147502 A1 | 6/2012 | Udo et al. | |
| 2013/0050875 A1 | 2/2013 | Yamada et al. | |
| 2013/0063837 A1 | 3/2013 | Udo et al. | |
| 2013/0146997 A1 | 6/2013 | Lee et al. | |
| 2013/0149499 A1 | 6/2013 | Lee et al. | |
| 2013/0250456 A1 | 9/2013 | Yamada et al. | |
| 2013/0251042 A1 | 9/2013 | Lee | |
| 2013/0271869 A1 | 10/2013 | Taguchi et al. | |
| 2014/0044598 A1 | 2/2014 | Hu et al. | |
| 2014/0078618 A1 | 3/2014 | Matsumoto et al. | |
| 2014/0139952 A1 | 5/2014 | Takeo et al. | |
| 2014/0146420 A1 | 5/2014 | Shimizu et al. | |
| 2014/0175050 A1 | 6/2014 | Zhang et al. | |
| 2014/0175575 A1 | 6/2014 | Doyle et al. | |
| 2014/0177100 A1 | 6/2014 | Sugiyama et al. | |
| 2015/0029615 A1 | 1/2015 | Chembrolu | |
| 2015/0098150 A1 | 4/2015 | Chiu et al. | |
| 2015/0103434 A1 | 4/2015 | Etoh et al. | |
| 2015/0103437 A1 | 4/2015 | Watanabe et al. | |
| 2015/0126326 A1 | 5/2015 | Kobayashi et al. | |
| 2015/0154987 A1 | 6/2015 | Etoh et al. | |
| 2015/0213814 A1 | 7/2015 | Chembrolu et al. | |
| 2015/0213820 A1 | 7/2015 | Chembrolu et al. | |
| 2015/0380017 A1 | 12/2015 | Chembrolu et al. | |
| 2016/0024755 A1 | 1/2016 | Kobiki | |
| 2016/0027455 A1 | 1/2016 | Kudo et al. | |
| 2016/0035375 A1 | 2/2016 | Gao | |
| 2016/0148629 A1 | 5/2016 | Gao et al. | |
| 2016/0225392 A1 | 8/2016 | Takeo et al. | |
| 2016/0343391 A1 | 11/2016 | Sasaki et al. | |
| 2017/0018285 A1 | 1/2017 | Chen et al. | |
| 2017/0061995 A1 | 3/2017 | Taguchi et al. | |
| 2017/0104151 A1 | 4/2017 | Banerjee et al. | |
| 2017/0140779 A1 | 5/2017 | Koui | |
| 2017/0148474 A1 | 5/2017 | Okamura et al. | |
| 2017/0236537 A1 | 8/2017 | Murakami et al. | |
| 2017/0309301 A1 | 10/2017 | Takahashi et al. | |
| 2018/0247668 A1 | 8/2018 | Biskeborn et al. | |
| 2018/0266848 A1 | 9/2018 | Das et al. | |
| 2018/0268848 A1 | 9/2018 | Narita et al. | |
| 2019/0088274 A1 | 3/2019 | Narita et al. | |
| 2019/0180779 A1 | 6/2019 | Biskeborn et al. | |
| 2019/0251991 A1 | 8/2019 | Le et al. | |

(56) References Cited

U.S. PATENT DOCUMENTS

| | | |
|---|---|---|
| 2019/0259413 A1 | 8/2019 | Le et al. |
| 2019/0267029 A1 | 8/2019 | Bai |
| 2020/0005815 A1 | 1/2020 | Bai et al. |

OTHER PUBLICATIONS

Y. Kanai et al.: "Micromagnetic Model Analysis of Various Spin Torque Oscillators with Write Head for Mircowave-assisted Magnetic Recording" IEEE International Magnetics Conference; Dublin, Ireland Apr. 24-28, 2017; https://eeexplore.ieee.org/document/8007581 (2 pages).

Kanai, Yasushi et al.: "Micromagnetic Model Simulations Considering Write Head, Spin-Torque Oscillator, and Double-Layered Medium Altogether"; Nigata Institute of Technology; IEEE Transactions on Magnetics; Sep. 2018; http:tmrc2018.ucsd.edu/Archive/C2.pdf (2 pages).

\* cited by examiner

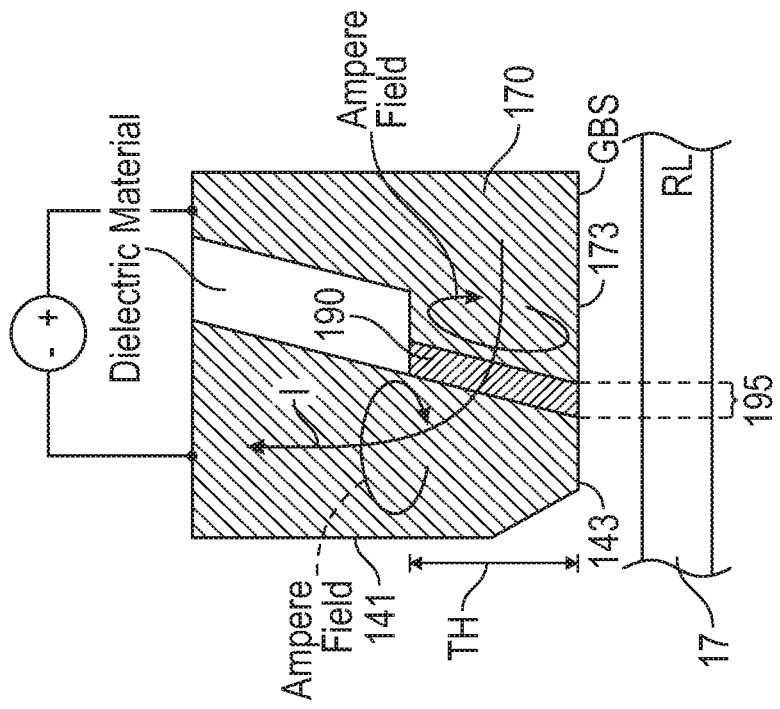
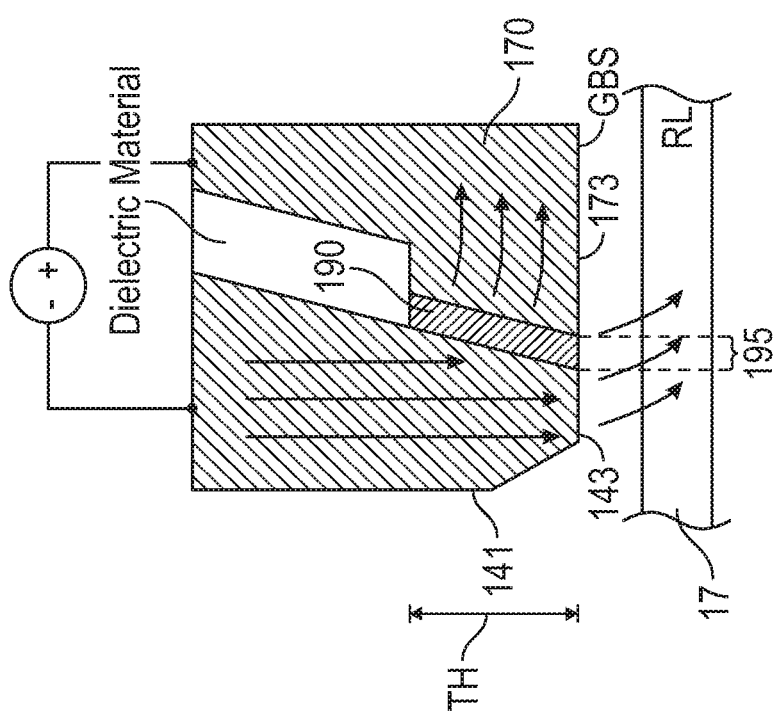
FIG. 3B
FIG. 3A

CURRENT-ASSISTED MAGNETIC RECORDING WRITE HEAD WITH WIDE CONDUCTIVE ELEMENT IN THE WRITE GAP

CROSS-REFERENCE TO RELATED APPLICATIONS

This application is a continuation of U.S. patent application Ser. No. 16/366,829, filed Mar. 27, 2019, which application claims benefit of U.S. Provisional Patent Application Ser. No. 62/686,208, filed Jun. 18, 2019, each of which is herein incorporated by reference.

BACKGROUND

Field of the Invention

This invention relates generally to magnetic recording systems, and more particularly to a magnetic recording system with a current-assisted write head.

Description of the Related Art

Perpendicular magnetic recording (PMR) in magnetic recording hard disk drives, wherein the recorded bits are stored in a perpendicular or out-of-plane orientation in the magnetic recording layer of the disk, allows for ultra-high recording density, i.e., the areal density of the recorded bits on the disk. The write head must be able to write data not only at high bit density but also at high data rates. The write speed is particularly important in enterprise disk drives. However, the time for the main pole of the write head to switch from one magnetization direction to the other is a limiting factor as the data rate is increased. At high data rates, the available magnetic flux from the write head, as seen by the recording layer on the disk, is dominated by the low-frequency flux output of the write head. The reason for such loss of write flux includes a slow intrinsic time-constant of the magnetization reversal in the main pole of the write head.

Various techniques have been proposed to increase the magnetization switching speed of the perpendicular write head. One technique is current assistance, wherein a separate electrical current source is used to generate a magnetic field that assists the magnetization reversal. U.S. Pat. No. 8,116,031 B2, assigned to the same assignee as this application, describes a write head with an auxiliary coil and current source that generates a magnetic field orthogonal to the write pole to apply a torque to the write pole magnetization and thereby facilitate magnetization switching. U.S. Pat. No. 7,072,142 B2, also assigned to the same assignee as this application, describes a write head with a magnetic bias field orthogonal to the magnetization of the write pole. The bias field is generated by current in the cross-track direction through a conductive element near the write pole and applies a torque to the write pole magnetization to facilitate switching.

FIG. 1 is a top plan view of a conventional head/disk assembly of a hard disk drive with the cover removed that may function as a current assisted magnetic recording disk drive according to embodiments of the invention. The disk drive 10 includes a rigid base 12 supporting a spindle 14 that supports a stack of disks, including top disk 16. The spindle 14 is rotated by a spindle motor (not shown) for rotating the disks in the direction shown by curved arrow on disk 16. The hard disk drive 10 has at least one load beam assembly 20 having an integrated lead suspension (ILS) or flexure 30 with an array 32 of electrically conductive interconnect traces or lines. The load beam assemblies 20 are attached to rigid arms 22 connected to an E-shaped support structure, sometimes called an E block 24. Each flexure 30 is attached to a gas-bearing slider 28. A magnetic recording read/write head 29 is located at the end or trailing surface of slider 28. In embodiments of this disclosure the write head 29 incorporates an electrically-conductive layer in the write gap. The flexure 30 enables the slider 28 to "pitch" and "roll" on a gas bearing (typically air or helium) generated by the rotating disk 16. Disk drive 10 also includes a rotary actuator assembly 40 rotationally mounted to the rigid base 12 at a pivot point 41. The actuator assembly 40 is a voice coil motor (VCM) actuator that includes a magnet assembly 42 fixed to base 12 and a voice coil 43. When energized by control circuitry (not shown) the voice coil 43 moves and thereby rotates E block 24 with attached arms 22 and load beam assemblies 20 to position the read/write heads 29 to the data tracks on the disks. The trace interconnect array 32 connects at one end to the read/write head 29 and at its other end to read/write circuitry contained in an electrical module or chip 50 secured to a side of the E-block 24. The chip 50 includes a read preamplifier and a write driver circuit.

SUMMARY

The prior art current-assisted write heads can be difficult to fabricate because they require a separate electrical coil and/or a separate electrical current path.

Embodiments of this invention relate to a current-assisted magnetic recording write head wherein a non-magnetic electrically conductive layer is in the write gap between the write pole and the trailing shield. Electrical circuitry directs current between the write pole and the trailing shield, through the conductive layer in the write gap. The current through the conductive layer generates an Ampere field substantially orthogonal to the magnetic flux in the write pole to assist magnetization switching of the write pole. Current-assisted magnetic recording is to be distinguished from microwave-assisted magnetic recording (MAMR) wherein an electrically conductive spin-torque oscillator (STO) is located in the write gap between the write pole and a trailing shield of the write head. In embodiments of this invention there is no STO in the write gap.

For the Ampere field to improve the write pole magnetization switching and thus reduce the soft error rate (SER) in the written data, a high bias voltage needs to be applied. However, this results in current crowding near the conductive layer, which generates a hot spot near the write pole. This can cause corrosion of the materials surrounding the write pole.

In embodiments of this invention, the conductive layer is wider in the cross-track direction than the trailing edge of the write pole. The conductive layer may have substantially the same along-the-track thickness across its width and may extend beyond the write pole side gaps so as to be in contact with both the side shields and the trailing shield. The wide conductive layer increases the area of the conductor, which reduces the electrical resistance. The current is spread to the side shields and trailing shield, which reduces the hot spot near the write pole. In some embodiments the conductive layer may have a thicker central region at the write pole trailing edge and thinner side regions. In one embodiment the side regions are electrically insulated from the side shields so that current is spread primarily to the trailing shield. In another embodiment the side regions are electrically insulated from both the side shields and the trailing shield so that current is spread to the trailing shield only through exposed edges of the side regions.

For a fuller understanding of the nature and advantages of the present invention, reference should be made to the following detailed description taken together with the accompanying figures.

BRIEF DESCRIPTION OF THE DRAWING

FIG. 3A is an illustration of the magnetic flux lines from the write field in the write pole that are directed substantially perpendicularly toward the recording layer and through the trailing shield when write current is directed through the write coil.

FIG. 3B is an illustration of the electrical current from the trailing shield through the electrically-conductive layer in the write gap to the write pole that generates an Ampere field that assists the switching of the magnetization of the write pole.

DETAILED DESCRIPTION

Figure 1:
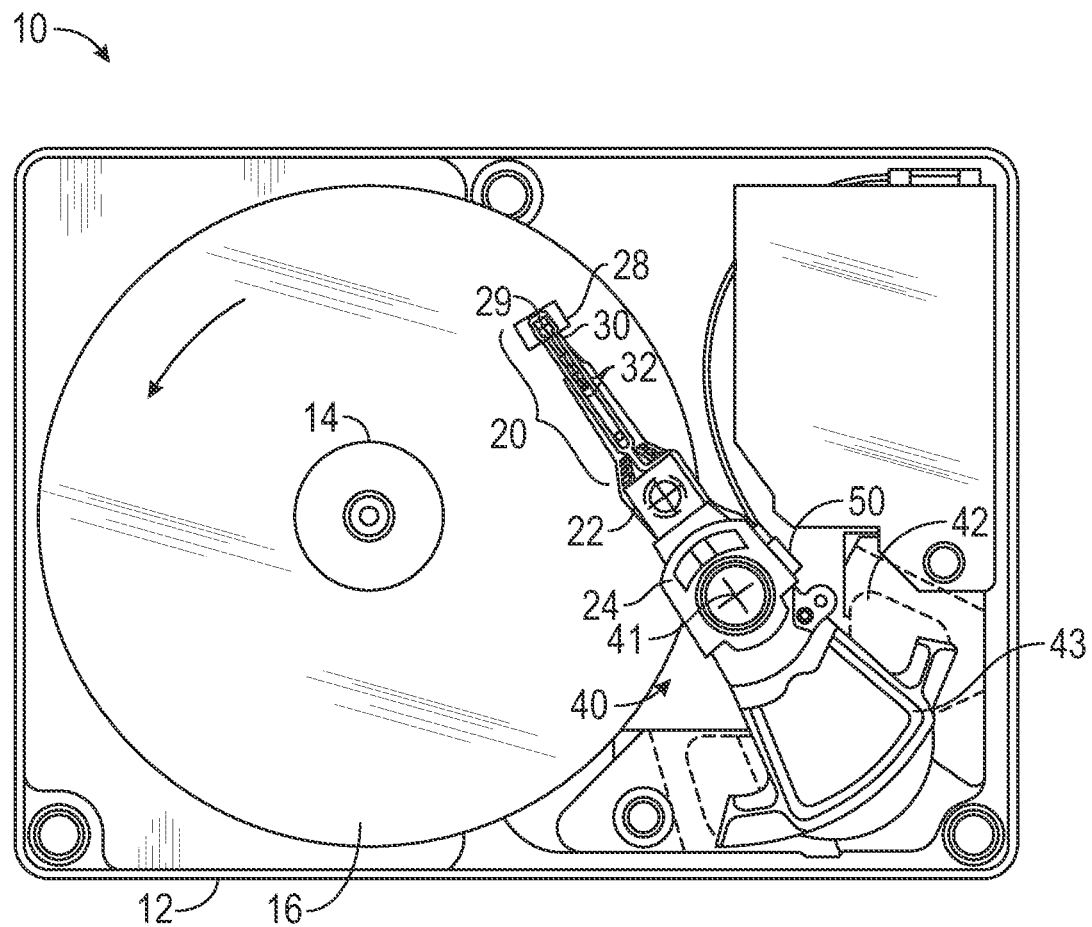
FIG. 1 is a top plan view of a conventional head/disk assembly of a hard disk drive with the cover removed that may function as a current-assisted magnetic recording disk drive according to embodiments of the invention.
Figure 2A:
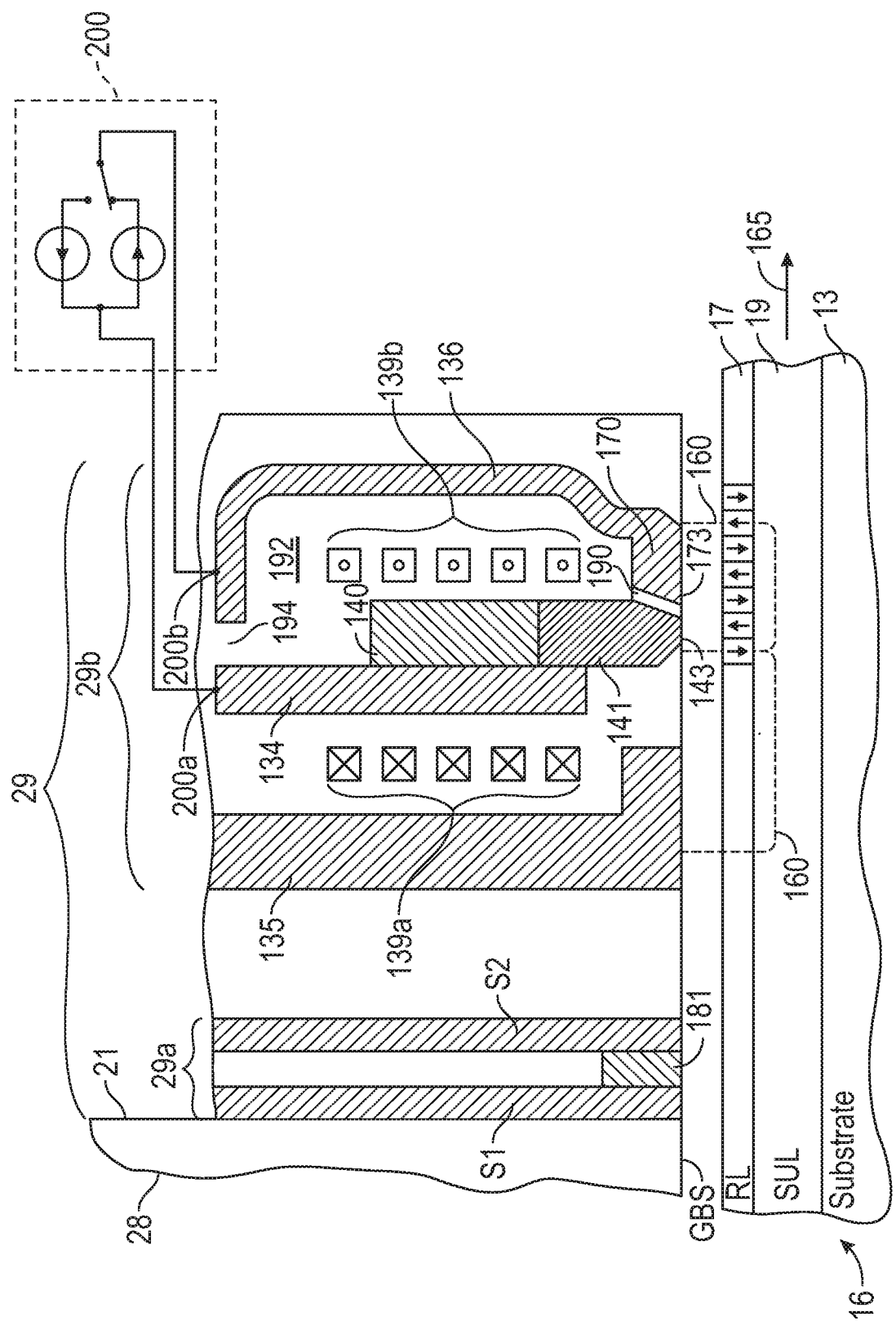
FIG. 2A is a side sectional view (not to scale) of a perpendicular magnetic recording write head with a non-magnetic electrically-conductive layer incorporated in the write gap according to embodiments of the invention, a read head and a recording disk taken through a central plane that intersects a data track on the disk.

FIG. 2A is a side sectional view (not to scale) of a perpendicular magnetic recording write head with a non-magnetic electrically-conductive layer 190 incorporated in the write gap, a read head and a recording disk taken through a central plane that intersects a data track on the disk. As shown in FIG. 2A, a "dual-layer" disk 16 includes a perpendicular magnetic data recording layer (RL) 17 on a "soft" or relatively low-coercivity magnetically permeable underlayer (SUL) 19 formed on the disk substrate 13. The read/write head 29 is formed on slider 28 that has a disk-facing or gas-bearing surface (GBS) and includes read head 29a and write head 29b. Read head 29a includes a magnetoresistive (MR) read element or sensor 181 located between two magnetic shields S1, S2. The current-assisted write head 29b is a perpendicular magnetic recording (PMR) write head and includes a yoke structure with main pole 134, write pole 141 with upper portion 140 and disk-facing end 143, optional first flux return pole 135, second flux return pole 136, trailing magnetic shield 170 with disk-facing end 173, and conductive layer 190. The electrically-conductive layer 190 may be a single layer formed of non-magnetic metals like Cu, Au, Ag, Ru, Cr, W, Mo, Ni, Ta, Pt or Rh or their alloys, or a multilayer of those materials, like a NiCr/Ru/NiTa multilayer. The main pole 134, write pole 141, return poles 135, 136 and trailing shield 170 are formed of ferromagnetic materials, typically alloys of one or more of Co, Fe and Ni. The write pole 141 is typically formed of a high-moment CoFe alloy.

The write head 29b also includes a thin film coil 139a, 139b shown in section around main pole 134. The write coil 139a, 139b is a helical coil wrapped around main pole 134, but the write coil may also be a conventional dual "pancake" coil in which all the coil sections are in substantially the same plane and wrapped around the yoke. A flared write pole 141 is part of the main pole 134 and has a pole tip with an end 143 that faces the outer surface of disk 16. Write current through coil 139a, 139b induces a magnetic field (shown by dashed line 160) from the write pole 141 that passes through the RL 17 (to magnetize the region of the RL 17 beneath the write pole end 143), through the flux return path provided by the SUL 19, and back to the end of optional first return pole 135 and end 173 of trailing shield 170.

The write head 29b also includes electrical circuitry 200 electrically connected to the main pole 134 and the second return pole 136. The circuitry 200 may include a voltage or current source (or a connection to an external voltage or current source) and one or more switching devices, such as transistors or relays that can switch the voltage or current on and off. The circuitry 200 is configured to provide a current or voltage to the main pole 134 and the return pole 136. For example, the circuitry 200 provides a current between the main pole 134 and the return pole 136/trailing shield 170 that flows through write pole 141 and conductive layer 190 in the write gap between the write pole 141 and trailing shield 170. The current through conductive layer 190 generates an Ampere field substantially orthogonal to the magnetic flux in write pole 141 to facilitate the reversal or switching of the magnetization of write pole 141 during writing. An insulating material portion 192 (for example alumina) is provided around the magnetic coil between the main pole 134, the trailing shield 170 and the return pole 136. An electrically insulating material layer 194 (for example alumina) can be provided between end portions of the main pole 134 and the return pole 136 where the circuitry connections (i.e., electrical contacts 200a, 200b attached to the ends of the main pole 134 and return pole 136, respectively) are made (i.e., distal from the GBS).

The read/write head 29 is typically formed as a series of thin films deposited on a trailing surface 21 of gas-bearing slider 28 that has its GBS supported above the surface of disk 16. The MR read head 29a is comprised of MR sensor 181 located between MR shields S1 and S2 and is deposited on the trailing end 21 of the slider 28 prior to the deposition of the layers making up the write head 29b. In FIG. 2A, the disk 16 moves past the write head 29b in the direction indicated by arrow 165, so the portion of slider 28 that supports the read head 29a and write head 29b is often called the slider "trailing" end, and the surface 21 perpendicular to the slider GBS on which the write head 29b is located is often called the slider "trailing" surface.

The RL 17 is illustrated with perpendicularly recorded or magnetized regions, with adjacent regions having opposite magnetization directions, as represented by the arrows. The magnetic transitions between adjacent oppositely-directed magnetized regions are detectable by the MR sensor 181 as the recorded bits.

Figure 2B:
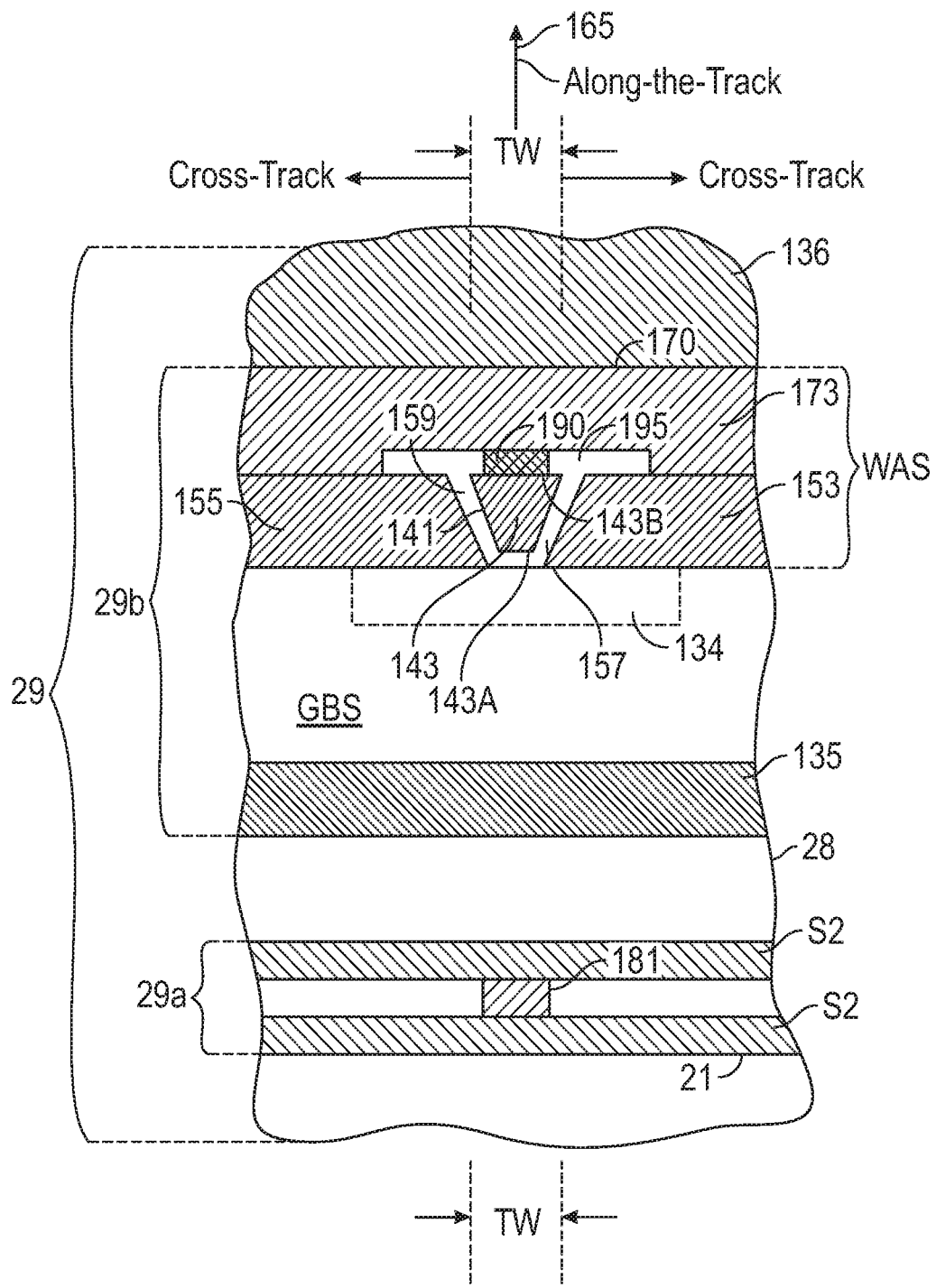
FIG. 2B is a view (not to scale) that illustrates the read head and current-assisted write head according to an embodiment of the invention as seen from the disk.

FIG. 2B is a view (not to scale) that illustrates the read head 29a and current-assisted write head 29b as seen from the disk 16. The GBS is the recording-layer-facing surface of the slider 28 that faces the disk 16 (FIG. 2A) and is shown without the thin protective overcoat typically present in an actual slider. The recording-layer-facing surface shall mean the surface of the slider 28 that is covered with a thin protective overcoat, the actual outer surface of the slider if there is no overcoat, or the outer surface of the overcoat. The phrase "substantially at the recording-layer-facing surface" shall mean actually at the surface or slightly recessed from the surface. The disk 16 (FIG. 2A) moves relative to the read/write head 29 along a line or direction 165, which is called the along-the-track line or direction. The line or direction perpendicular to direction 165 and parallel to the plane of the GBS is called the cross-track line or direction. The write pole 141 has an end 143 at the GBS. The write pole end 143 has a leading edge 143A and a trailing edge 143B. The cross-track width of write pole trailing edge 143B substantially defines the track-width (TW) of the data tracks in the RL 17 (FIG. 2A). The main pole 134 is shown with dashed lines because it is recessed from the GBS (see FIG. 2A).

The portions identified as 153, 155 on opposite sides of the non-magnetic electrically-insulating side gaps 157, 159 are side shields. A trailing shield 170 with an end 173 at the GBS is spaced from the write pole trailing edge 143B in the along-the-track direction by write gap 195. The shields 170, 153, 155 all have ends substantially at the GBS and are typically formed of a ferromagnetic material like a NiFe, CoFe or NiFeCo alloy. The shields 170, 153, 155 may be formed as a single-piece structure to form a wraparound shield (WAS) that substantially surrounds the write pole end 143. The non-magnetic electrically conductive layer 190 is in the write gap 195 between the write pole trailing edge 143B and the trailing shield 170. In the embodiment of FIG. 2B the conductive layer 190 has a cross-track width equal to or less than the cross-track width of the write pole trailing edge 143B, and a thickness in the along-the-track direction typically in the range of about 12 to 30 nm. The WAS alters the angle of the write field and improves the write field gradient at the point of writing, and shields the writing field at regions of the RL away from the track being written. The WAS is shown as connected to the return pole 136. However, the WAS may be a "floating" WAS shield not connected to either the return pole 136 or other portions of the yoke by flux-conducting material. Also, instead of a WAS, the write head 29b may have separate side shields not connected to the trailing shield 170.

The general operation of the current-assisted write head with an electrically-conductive layer in the write gap will be explained with the side sectional views of FIGS. 3A-3B. The conductive layer 190 in write gap 195 has a throat height (TH) as measured from the GBS to an end recessed from the GBS. The typical throat height may be in the range of about 30 to 70 nm. The area above conductive layer 190 in write gap 195 is filled with dielectric material. The typical along-the-track thickness of conductive layer 190 is in the range of about 12 to 30 nm. In FIG. 3A, a magnetic write field in write pole 141 is directed substantially perpendicularly toward the RL 17 and into the trailing shield 170 when write current is directed through coil 139a, 139b (FIG. 2A). The arrows in FIG. 3A represent the magnetic flux from the write field. Simultaneously, as shown in FIG. 3B, electrical current from circuitry 200 (FIG. 2A) passes from trailing shield 170 through conductive layer 190 to write pole 141 (or alternatively from write pole 141 to trailing shield 170). According to Ampere's law, this current will produce a circular magnetic field that is in the direction substantially transverse to the direction of current flow. Since the current direction is in substantially the same direction as the magnetic flux, or magnetization in write pole 141, this Ampere field is also transverse to the magnetization of the write pole 141. This produces a transverse magnetization component with respect to the flux flow direction in the write pole 141. This creates a torque on the write pole magnetization that makes the flux reversal in the write pole faster and with less jitter in the timing of the write pulses. This increased speed in magnetization reversal or switching of the write pole and the reduced timing jitter enables an increase in disk areal data density.

For the Ampere field to improve the write pole magnetization switching and thus reduce the soft error rate (SER) in the written data, a high bias voltage needs to be applied. However, this results in current crowding near the conductive layer, which generates a hot spot near the write pole. This can cause corrosion of the materials surrounding the write pole.

Figure 4:
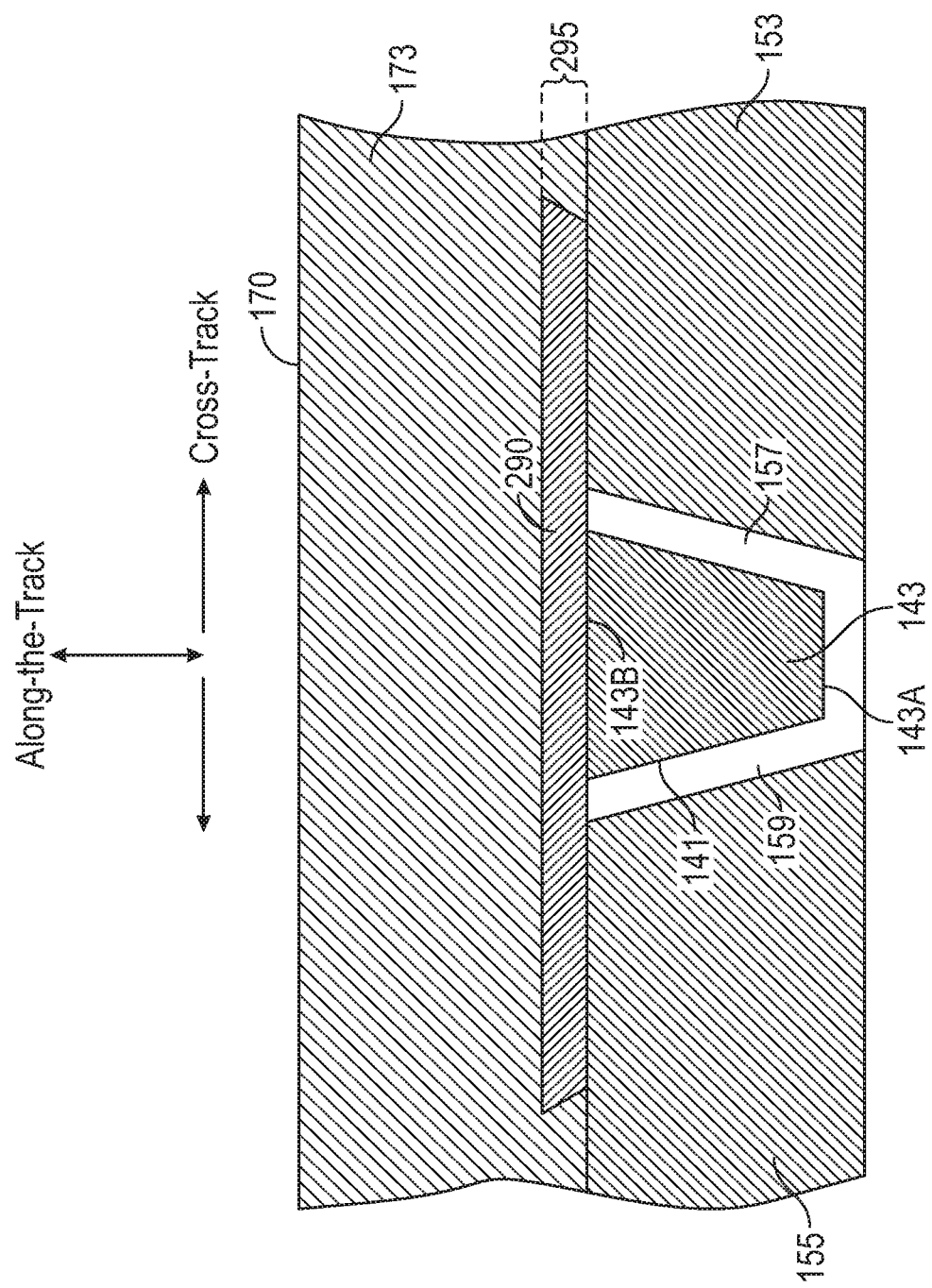
FIG. 4 is a gas-bearing surface (GBS) view of an embodiment of the current-assisted write head wherein the conductive layer is wider than the write pole trailing edge.

FIG. 4 is a GBS view of an embodiment of the current-assisted write pole wherein the conductive layer is wider than the write pole trailing edge. The conductive layer 290 is in the write gap 295 between the write pole trailing edge 143B and the trailing shield 170 and is wider than the cross-track width of the write pole trailing edge 143B. In the embodiment of FIG. 4 conductive layer 290 has substantially the same along-the-track thickness across its width and extends beyond side gaps 157, 159 so as to be in contact with the side shields 153, 155 and trailing shield 170. The wide conductive layer increases the area of the conductor, which reduces the electrical resistance. The current is spread to the side shields and trailing shield, which reduces the hot spot near the write pole. The electrically-conductive layer 290 may be a single layer formed of non-magnetic metals like Cu, Au, Ag, Ru, Cr, W, Mo, Ni, Ta, Pt or Rh or their alloys, or a multilayer of those materials, like a NiCr/Ru/NiTa multilayer.

Figure 5A:
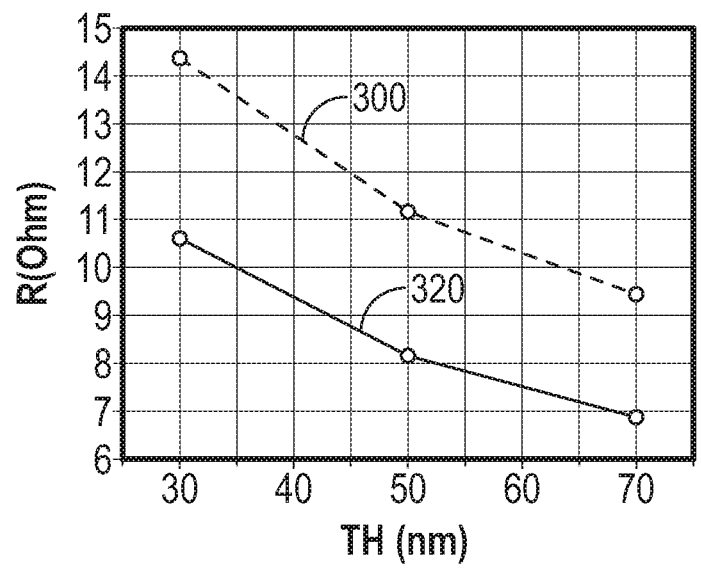
FIG. 5A is a graph comparing the electrical resistance, as a function of the conductive layer throat height (TH), of a wide conductive layer and a conductive layer with a width equal to the width of the write pole trailing edge.
Figure 5B:
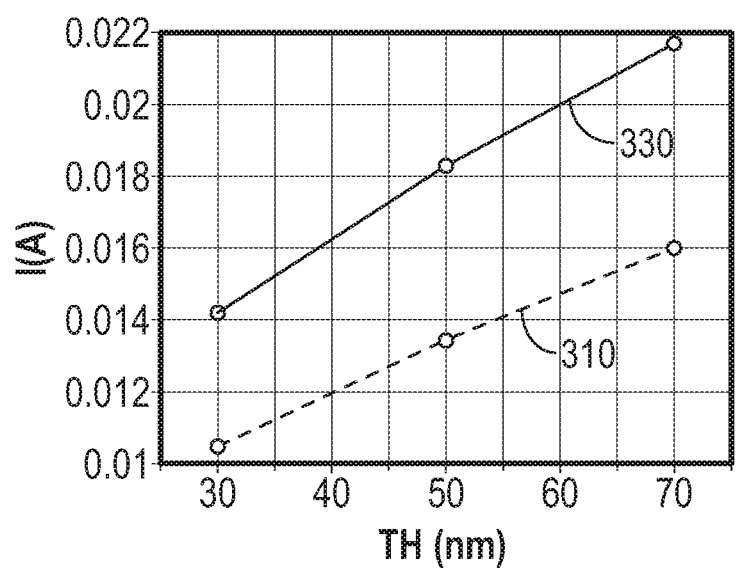
FIG. 5B is a graph comparing the current for the two examples of FIG. 5A.

FIG. 5A is a graph comparing the electrical resistance, as a function of conductive layer throat height (TH), of a wide conductive layer and a conductive layer with a width equal to the width of the write pole trailing edge. FIG. 5B is a graph comparing the current for the two examples of FIG. 5A. Lines 300, 310 are for a conductive layer with an along-the-track thickness of 19 nm and a cross-track width of 55 nm, which is equal to the cross-track width of the write pole trailing edge. Lines 320, 330 are for a conductive layer with an along-the-track thickness of 19 nm and a cross-track width of 255 nm, which is a width that extends beyond the side gaps into contact with the side shields, as depicted in FIG. 4. The wide conductive layer substantially reduces the electrical resistance, which reduces heating. While the current is increased, it is spread out across the width of the conductive layer into the trailing shield and side shields, which reduces the hot spot near the write pole.

Figure 6:
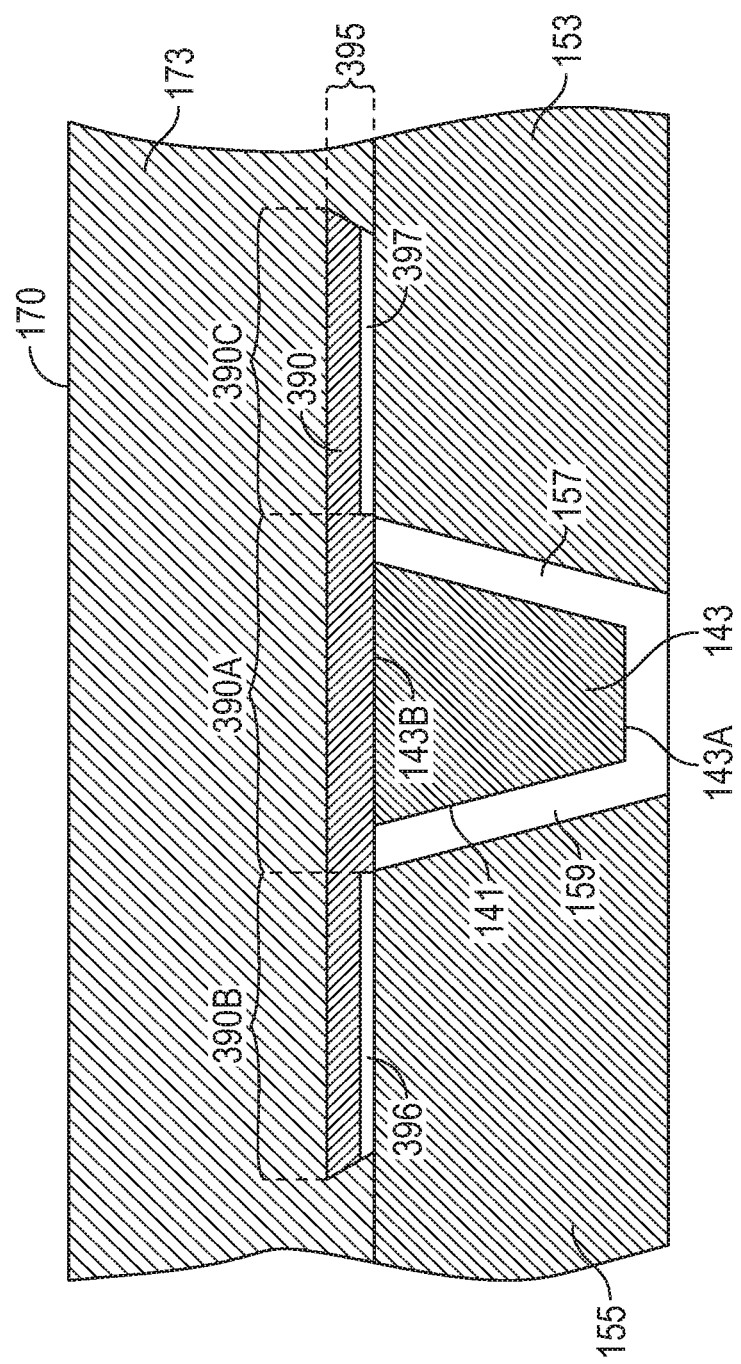
FIG. 6 is a GBS view of another embodiment of the current-assisted write head according to the invention.

FIG. 6 is a GBS view of another embodiment of the current-assisted write pole according to the invention. The conductive layer 390 in write gap 395 has a central region 390A and side regions 390B, 390C, with the side regions being thinner in the along-the-track direction than the central region. The central region 390A has a cross-track width at least as wide as the cross-track width of the write pole trailing edge 143B, for example as wide as the total width of the trailing edge 143B and the two insulating side gaps 157, 159. The side regions 390B, 390C extend beyond the side gaps 157, 159 and are also in contact with the trailing shield 170. However, electrically insulating side layers 396, 397 are located between respective side regions 390B, 390C and respective side shields 155, 153. The insulating side layers 396, 397 may be formed of the same material as side gaps, 157, 159, for example alumina. In this embodiment, because of the insulating side layers 396, 397 the current is spread primarily only to the trailing shield 170.

Figure 7:
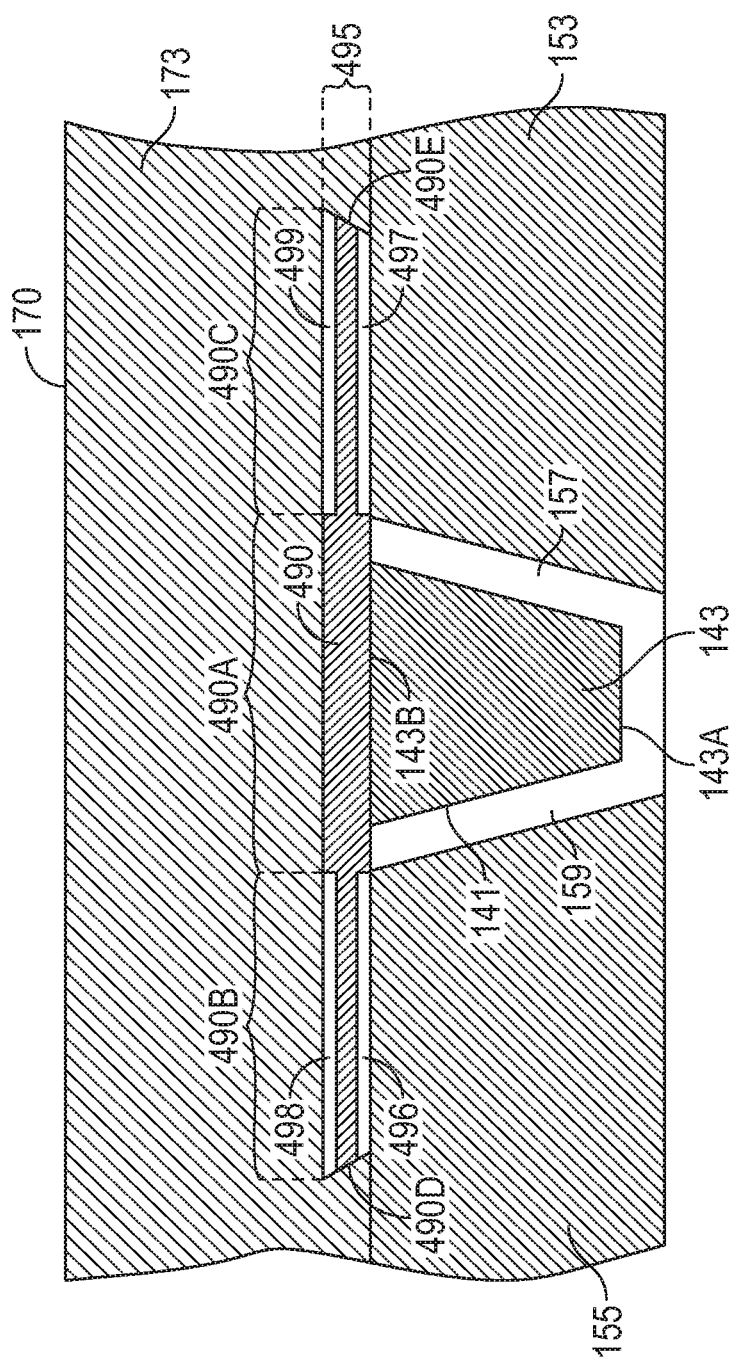
FIG. 7 is a GBS view of still another embodiment of the current-assisted write head according to the invention.

FIG. 7 is a GBS view of still another embodiment of the current-assisted write pole according to the invention. The conductive layer 490 in write gap 495 has a central region 490A and side regions 490B, 490C. The central region 490A has a cross-track width at least as wide as the cross-track width of the write pole trailing edge 143B. The side regions 490B, 490C extend beyond the side gaps 157, 159, but are in contact with the trailing shield 170 only at the edges 490D, 490E. Electrically insulating side layers 496, 497 are located between respective side regions 490B, 490C and respective side shields 155, 153. Additionally, electrically insulating side layers 498, 499 are located between respective side regions 490B, 490C and the trailing shield 170 so that only the edges 490D, 490E are in contact with the trailing shield 170. The electrically insulating side layers 496, 497, 498, 499 may be formed of the same material as side gaps, 157, 159, for example alumina. In this embodiment the current is spread only to the trailing shield 170 through the side edges 490D, 490E.

Figure 8:
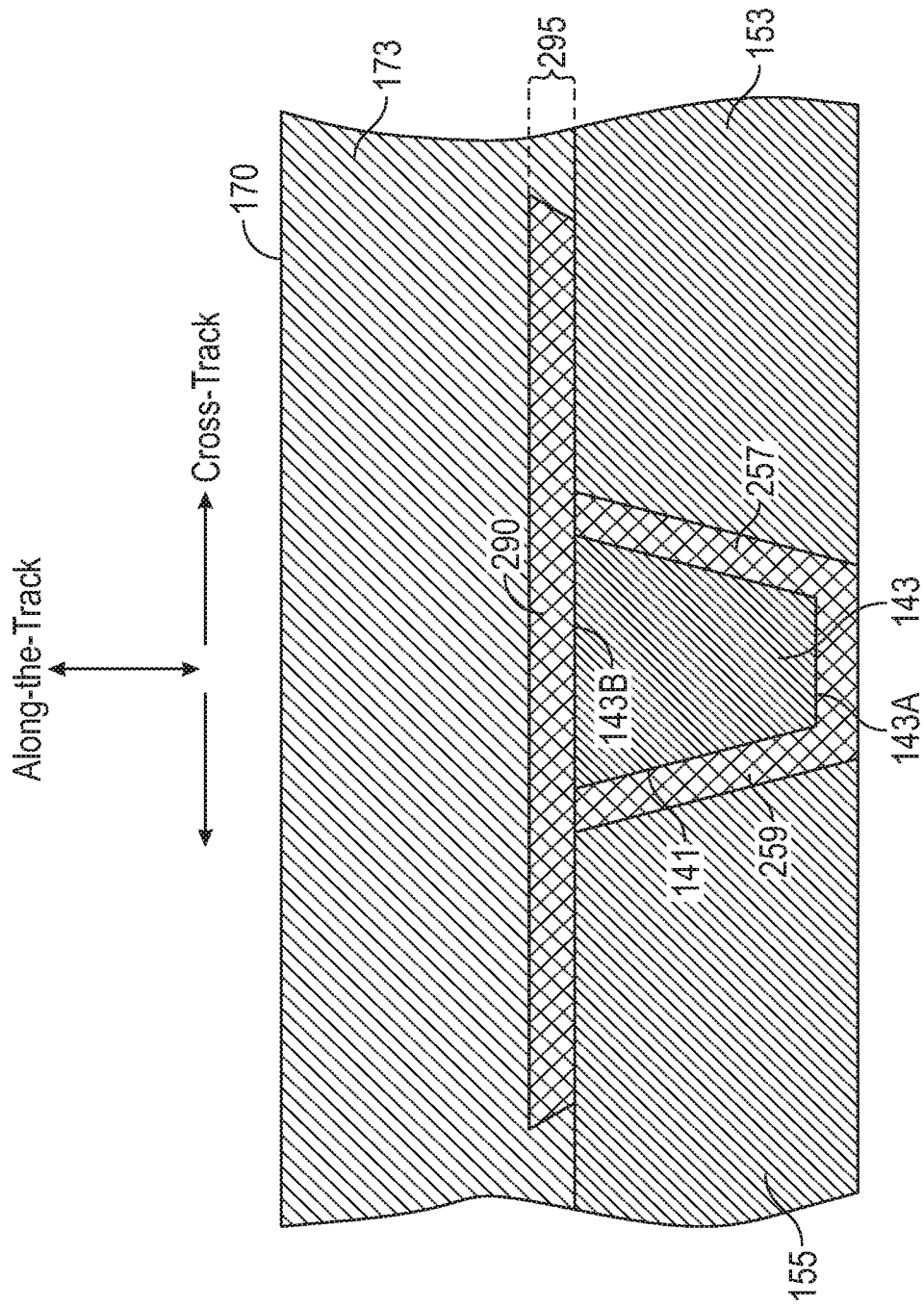
FIG. 8 is a GBS view of another embodiment of the current-assisted write head according to the invention wherein the side gaps are also formed of electrically-conductive material.

FIG. 8 is a GBS view of another embodiment of the current-assisted write head according to the invention wherein the side gaps are also formed of electrically-conductive material. The write head has the wide conductive layer 290 in the write gap 295, like in the embodiment of FIG. 4, but the side gaps 257, 259 are also formed of electrically-conductive non-magnetic material. The wide conductive layer 290 is wider than the write pole trailing edge 143b and in the embodiment of FIG. 8 extends beyond side gaps 257, 259 so as to be in contact with the side shields 153, 155 and trailing shield 170. Each side gap 257, 259 may be a single layer formed of non-magnetic metals like Cu, Au, Ag, Ru, Cr, W, Mo, Ni, Ta, Pt or Rh or their alloys, or a multilayer of those materials, like a NiCr/Ru/NiTa multilayer.

While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. A magnetic head, comprising:
   a write pole having a trailing edge;
   a trailing shield spaced from the write pole to define a write gap; and
   an electrically-conductive layer disposed in the write gap, the electrically-conductive layer having a cross-track width greater than a cross-track width of the write pole trailing edge, wherein the write pole and trailing shield are adapted to pass electrical current between the write pole and trailing shield through the electrically-conductive layer in the write gap.

2. The magnetic head of claim 1, wherein the electrically-conductive layer is in contact with the trailing shield.

3. The magnetic head of claim 1, wherein the electrically-conductive layer has a central region with a cross-track width at least as wide as the cross-track width of the write pole trailing edge.

4. The magnetic head of claim 3, further comprising a layer of electrically insulating material between an electrically-conductive layer side region and the trailing shield.

5. The magnetic head of claim 1, further comprising a side shield on each cross-track side of the write pole end and a side gap between each side shield and the write pole end.

6. The magnetic head of claim 5, wherein each side gap is formed of electrically-insulating material.

7. The magnetic head of claim 5, wherein each side gap is formed of non-magnetic electrically-conducting material.

8. The magnetic head of claim 5, wherein the electrically-conductive layer cross-track width is at least as wide as a total cross-track width of the write pole trailing edge and both side gaps.

9. The magnetic head of claim 8, wherein the electrically-conductive layer is in contact with both side shields.

10. The magnetic head of claim 8, further comprising a layer of electrically insulating material between the electrically-conductive layer and each side shield.

11. The magnetic head of claim 1, wherein the electrically-conductive layer comprises a material selected from Cu, Au, Ag, Ru, Cr, W, Ni, Ta, Mo, Pt, Rh and alloys thereof.

12. The magnetic head of claim 1, further comprising electrical circuitry connected to the write pole and the trailing shield.

13. A magnetic recording disk drive, comprising:
   a magnetic head, comprising:
      a write pole having a trailing edge;
      a trailing shield spaced from the write pole to define a write gap; and
      an electrically-conductive layer disposed in the write gap, the electrically-conductive layer having a cross-track width greater than a cross-track width of the write pole trailing edge, wherein the write pole and trailing shield are adapted to pass electrical current between the write pole and trailing shield through the electrically-conductive layer in the write gap.

14. A magnetic head, comprising:
   a write pole having a trailing edge;
   a side shield on each cross-track side of the write pole end and a side gap between each side shield and the write pole end;
   a trailing shield having an end substantially at a gas bearing surface (GBS), the trailing shield end being spaced from the write pole trailing edge to define a write gap;
   a non-magnetic electrically-conductive layer in the write gap in contact with the write pole trailing edge and the trailing shield, the non-magnetic electrically-conductive layer having a cross-track width greater than the cross-track width of the write pole trailing edge;
   an electrical circuit coupled to the write pole and the trailing shield for directing electrical current between the write pole and trailing shield through the non-magnetic electrically-conductive layer in the write gap;
   a return pole formed of ferromagnetic electrically-conductive material and coupled to the trailing shield; and
   an electrical coil coupled to the write pole and return pole for generating a magnetic write field in the write pole.

15. The magnetic head of claim 14, wherein the non-magnetic electrically-conductive layer is in contact with both side shields.

16. The magnetic head of claim 15, further comprising a layer of electrically insulating material between the non-magnetic electrically-conductive layer and each side shield.

17. The magnetic head of claim 14, wherein the non-magnetic electrically-conductive layer has a central region with a cross-track width at least as wide as the cross-track width of the write pole trailing edge and a side region on each cross-track side of the central region.

18. The magnetic head of claim 17, further comprising a layer of electrically insulating material between each non-magnetic electrically-conductive layer side region and the trailing shield.

19. The magnetic head of claim 14, wherein both side gaps are formed of a non-magnetic electrically-insulating material or a non-magnetic electrically-conducting material.

20. A magnetic recording disk drive, comprising:
   a magnetic head, comprising:
      a write pole having a trailing edge;
      a side shield on each cross-track side of the write pole end and a side gap between each side shield and the write pole end;
      a trailing shield having an end substantially at a gas bearing surface (GBS), the trailing shield end being spaced from the write pole trailing edge to define a write gap;
      a non-magnetic electrically-conductive layer in the write gap in contact with the write pole trailing edge and the trailing shield, the non-magnetic electrically-conductive layer having a cross-track width greater than the cross-track width of the write pole trailing edge;
   an electrical circuit coupled to the write pole and the trailing shield for directing electrical current between the write pole and trailing shield through the non-magnetic electrically-conductive layer in the write gap;
   a return pole formed of ferromagnetic electrically-conductive material and coupled to the trailing shield; and
   an electrical coil coupled to the write pole and return pole for generating a magnetic write field in the write pole.

* * * * *